(12) United States Patent
Krieg

(10) Patent No.: US 10,220,819 B2
(45) Date of Patent: Mar. 5, 2019

(54) METHOD FOR OPERATING AN ASSISTANCE SYSTEM OF A VEHICLE WITH AT LEAST ONE ELECTRICAL ENERGY STORE

(71) Applicant: Robert Bosch GmbH, Stuttgart (DE)

(72) Inventor: Berengar Krieg, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 15/327,884

(22) PCT Filed: Jun. 26, 2015

(86) PCT No.: PCT/EP2015/064591
§ 371 (c)(1),
(2) Date: Jan. 20, 2017

(87) PCT Pub. No.: WO2016/012197
PCT Pub. Date: Jan. 28, 2016

(65) Prior Publication Data
US 2017/0203739 A1    Jul. 20, 2017

(30) Foreign Application Priority Data
Jul. 24, 2014 (DE) .......................... 10 2014 214 594

(51) Int. Cl.
*B60T 7/12* (2006.01)
*B60L 3/00* (2006.01)
(Continued)

(52) U.S. Cl.
CPC .............. *B60T 7/12* (2013.01); *B60L 3/0046* (2013.01); *B60L 11/18* (2013.01); *B60L 11/187* (2013.01);
(Continued)

(58) Field of Classification Search
CPC .............. B60T 7/12; B60Q 9/00; G01C 21/28
See application file for complete search history.

(56) References Cited

U.S. PATENT DOCUMENTS 4,129,001 A * 12/1978 Keyzer ............... B60R 16/0235
                                                                 123/549
7,612,524 B2 * 11/2009 Howell ................. H02J 7/1438
                                                                 320/104
(Continued)

FOREIGN PATENT DOCUMENTS

DE      3744264        7/1989
DE      19922331      11/2000
(Continued)

OTHER PUBLICATIONS

International Search Report for Application No. PCT/EP2015/064591 dated Sep. 2, 2015 (English Translation, 3 pages).

*Primary Examiner* — Alex C Dunn
(74) *Attorney, Agent, or Firm* — Michael Best & Friedrich LLP

(57) ABSTRACT

Method for operating an assistance system of a vehicle with at least one electrical energy store, comprising the following steps: —detecting a temperature of the electrical energy store of the vehicle by means of at least one first sensor, —identifying an operating state of the electrical energy store by means of the detected temperature of the electrical energy store by a control unit, —determining the position of the vehicle and/or detecting an operating parameter of the vehicle more particularly by means of at least one second sensor, communicating the operating state to the assistance system of the vehicle, wherein at least one signal is generated by the assistance system in the case of an abnormal operating state of the electrical energy store if the position of the vehicle is within a predefinable geographical area.

13 Claims, 2 Drawing Sheets

(51) Int. Cl.
    *B60L 11/18* (2006.01)
    *B60Q 9/00* (2006.01)
    *G01C 21/28* (2006.01)
    *G01S 19/17* (2010.01)
    *G01S 19/46* (2010.01)
    *H01M 10/0525* (2010.01)
    *H01M 10/48* (2006.01)
    *H01M 12/08* (2006.01)
    *H04W 4/04* (2009.01)
    *H04W 4/90* (2018.01)

(52) U.S. Cl.
    CPC ............... *B60Q 9/00* (2013.01); *G01C 21/28* (2013.01); *G01S 19/17* (2013.01); *G01S 19/46* (2013.01); *H01M 10/0525* (2013.01); *H01M 10/486* (2013.01); *H01M 12/08* (2013.01); *H04W 4/046* (2013.01); *B60L 2200/12* (2013.01); *B60L 2240/545* (2013.01); *B60L 2240/60* (2013.01); *H01M 2220/20* (2013.01); *H04W 4/90* (2018.02); *Y02T 10/7005* (2013.01); *Y02T 10/705* (2013.01); *Y02T 10/7291* (2013.01); *Y02T 90/16* (2013.01); *Y02T 90/161* (2013.01)

(56) References Cited

U.S. PATENT DOCUMENTS

| | | | |
|---|---|---|---|
| 9,122,567 B2 * | 9/2015 | MacNeille | G01C 21/3415 |
| 2007/0142169 A1 * | 6/2007 | Marcil | B60K 28/06 |
| | | | 477/107 |
| 2008/0300729 A1 | 12/2008 | Bono | |
| 2012/0001746 A1 | 1/2012 | Kamiya | |
| 2012/0016551 A1 | 1/2012 | Krause et al. | |
| 2012/0303397 A1 * | 11/2012 | Prosser | H02J 7/0054 |
| | | | 705/7.12 |
| 2013/0151180 A1 * | 6/2013 | Koch | B60L 11/1805 |
| | | | 702/63 |
| 2013/0229742 A1 * | 9/2013 | Auguet | B60L 3/0046 |
| | | | 361/114 |
| 2013/0260192 A1 | 10/2013 | Leport | |
| 2014/0139354 A1 * | 5/2014 | Miyazaki | B60L 11/1816 |
| | | | 340/902 |
| 2014/0210267 A1 * | 7/2014 | Ishida | H02J 7/0021 |
| | | | 307/31 |
| 2014/0221781 A1 * | 8/2014 | Schrauf | A61B 5/0205 |
| | | | 600/301 |
| 2014/0309789 A1 * | 10/2014 | Ricci | B60Q 1/00 |
| | | | 700/276 |
| 2015/0066837 A1 * | 3/2015 | Twarog | B60L 11/1851 |
| | | | 706/58 |
| 2015/0329003 A1 * | 11/2015 | Li | B60L 11/1816 |
| | | | 320/134 |

FOREIGN PATENT DOCUMENTS

| | | |
|---|---|---|
| DE | 102006016034 | 10/2007 |
| DE | 102011078444 | 3/2012 |
| DE | 102010054463 | 6/2012 |
| DE | 102011115908 | 4/2013 |
| DE | 102012207152 | 10/2013 |
| DE | 102012222787 | 3/2014 |
| EP | 2708457 | 3/2014 |
| EP | 2757654 | 7/2014 |

\* cited by examiner

METHOD FOR OPERATING AN ASSISTANCE SYSTEM OF A VEHICLE WITH AT LEAST ONE ELECTRICAL ENERGY STORE

BACKGROUND OF THE INVENTION

The invention is based on a method for operating an assistance system of a vehicle having at least one electrical energy store.

Methods for assistance systems of vehicles are known from the prior art, which methods, in an emergency, initiate an emergency call and transmit a position of the vehicle.

For instance, DE102012207152 discloses a method and a device for initiating at least one safety function when an electrochemical energy store and electrochemical energy-store system is in a safety-critical condition.

US2013/0260192 discloses a system for detecting a thermal event within sealed battery packs on the basis of a monitored pressure change within the battery pack.

DE102011078444 discloses a charge control apparatus having a main control unit and a power-source control unit, and discloses an emergency notification system.

SUMMARY OF THE INVENTION

The disadvantage with the known prior art is that although an emergency for the vehicle is detected by sensors, and an emergency call is initiated and the position of the vehicle is transmitted to an emergency call center, the position of the vehicle is not evaluated, for instance in order to take action before an emergency.

The procedure according to the invention having the characterizing features of the independent claims has the advantage over the prior art that for the purpose of operating an assistance system of a vehicle having at least one electrical energy store, a temperature of the electrical energy store of the vehicle is detected by means of at least one first sensor, a control unit uses the detected temperature of the electrical energy store to identify an operating state of the electrical energy store, a position of the vehicle is determined and/or an operating parameter of the vehicle is detected in particular by means of at least one second sensor, and the operating state is transmitted to the assistance system of the vehicle, and in the event of an abnormal operating state of the electrical energy store, the assistance system generates at least one signal if the position of the vehicle lies within a definable geographic region.

The subject matter of the dependent claims contains further advantageous embodiments of the present invention.

In one advantageous embodiment, the region comprises safety-critical environments such as, for instance, tunnels, underground garages, filling stations and/or chemical plants.

In another advantageous embodiment, the region comprises a plurality of sub-regions so that, for example, different actions can be taken according to a distance from an object within the safety-critical environment.

Advantageously, in addition to determining a position of the vehicle, a direction of travel and an instantaneous speed of the vehicle are also detected so that, for instance in the event of a fault in the second sensor, an assumed position of the vehicle is obtained from the last position, the direction of travel and/or the instantaneous speed.

The signal advantageously initiates an instantaneous intervention for reducing a speed of the vehicle, thereby reducing the speed of the vehicle.

The signal advantageously initiates deceleration of the vehicle by means of a braking intervention, which makes a driver of the vehicle aware of the abnormal operating state of the electrical energy store, or emergency braking is performed that takes into account dynamic stability limits of the vehicle. The braking intervention, for example, is performed by a traffic-jam assistance system or forward collision avoidance system of the vehicle, which system receives the signal.

Braking the vehicle by means of an instantaneous intervention and/or by means of emergency braking prevents, in the event of an abnormal operating state, the vehicle from travelling into one of the safety-critical environments and/or continuing to travel inside the safety-critical environments, for instance on overheating being detected in the electrical energy store, the vehicle is kept from driving into a tunnel or a filling station by stopping the vehicle in good time, thereby preventing a potential fire in the electrical energy store inside the tunnel.

The signal advantageously initiates isolation of the electrical energy store from a drivetrain of the vehicle, for instance thereby safely preventing a charging process through recuperation.

The signal advantageously initiates an emergency running mode of the vehicle at a reduced drive power, for instance the vehicle only continues to travel at a power provided solely by a range extender, thereby preventing a load on the electrical energy store.

The signal advantageously initiates switching-on a hazard warning system of the vehicle, thereby making other road users aware of a potential hazardous situation of the vehicle.

The signal advantageously initiates an emergency call to an emergency call center, whereby rescue services are alerted in good time and suitable countermeasures are taken by prompt arrival of the rescue services.

The signal advantageously triggers a visual, acoustic and/or haptic warning to a driver of the vehicle, whereby the driver is made aware of the abnormal operating state and can take actions independently or change and/or cancel actions already initiated.

A situation applicable to changing and/or cancelling an initiated action arises, for example, when restarting the drivetrain of the vehicle is prevented by the signal as a result of an abnormal operating state of the electrical energy store, but the position of the vehicle lies within a first safety-critical region, for example if overheating of the electrical energy store is detected during a charging process at a filling station. Cancelling the action and restarting the drivetrain allows the driver of the vehicle to drive the vehicle out of the safety-critical region, although at the same time, if there is a transition from the first safety-critical region into a second safety-critical region, for instance into a tunnel coming a short distance after the filling station, the method according to the invention generates a signal, as a result of which an instantaneous intervention is made, for example.

The signal advantageously prevents restarting of the drive system of the vehicle as long as the electrical energy store is in an abnormal operating state and/or the position of the vehicle lies within the definable geographic region, thereby preventing a mistaken startup, for instance as a result of a change in driver.

The geographic regions are specified, for example, by enhancing navigation maps with information about safety-critical regions for vehicles having at least one electrical energy store, for example by means of overlay maps for the existing navigation maps, and/or by defining the safety-critical regions using geographical coordinates.

The temperature, the operating state and/or the signal are advantageously transmitted by wired means, for instance by means of a CAN bus, Flexray bus, MOST bus and/or LIN bus, and/or by wireless means, for example by means of Bluetooth, UMTS, LTE and/or WLAN.

The position of the vehicle is advantageously determined using a satellite-based and/or cellular-network based technique by means of a control unit of the vehicle, by means of a navigation system of the vehicle and/or by means of a smartphone of the driver.

The assistance system comprises at least one control unit for performing the method according to the invention, wherein advantageously a first sensor detects a temperature of an electrical energy store of a vehicle, and a second sensor detects a position and/or an operating parameter of the vehicle.

The operating parameter advantageously comprises the speed of the vehicle, a wheel speed, an instantaneous request by the driver of the vehicle, a charging or discharging current of the electrical energy store, an external temperature, a steering angle and/or a transverse acceleration of the vehicle.

The method according to the invention is advantageously used in a vehicle having at least a lithium-ion battery, a lithium-sulfur battery and/or a lithium-air battery.

BRIEF DESCRIPTION OF THE DRAWINGS

Exemplary embodiments of the invention are explained in greater detail in the following description and depicted in the drawing, in which.

DETAILED DESCRIPTION

The same reference signs denote the same device components in all the figures.

Figure 1:
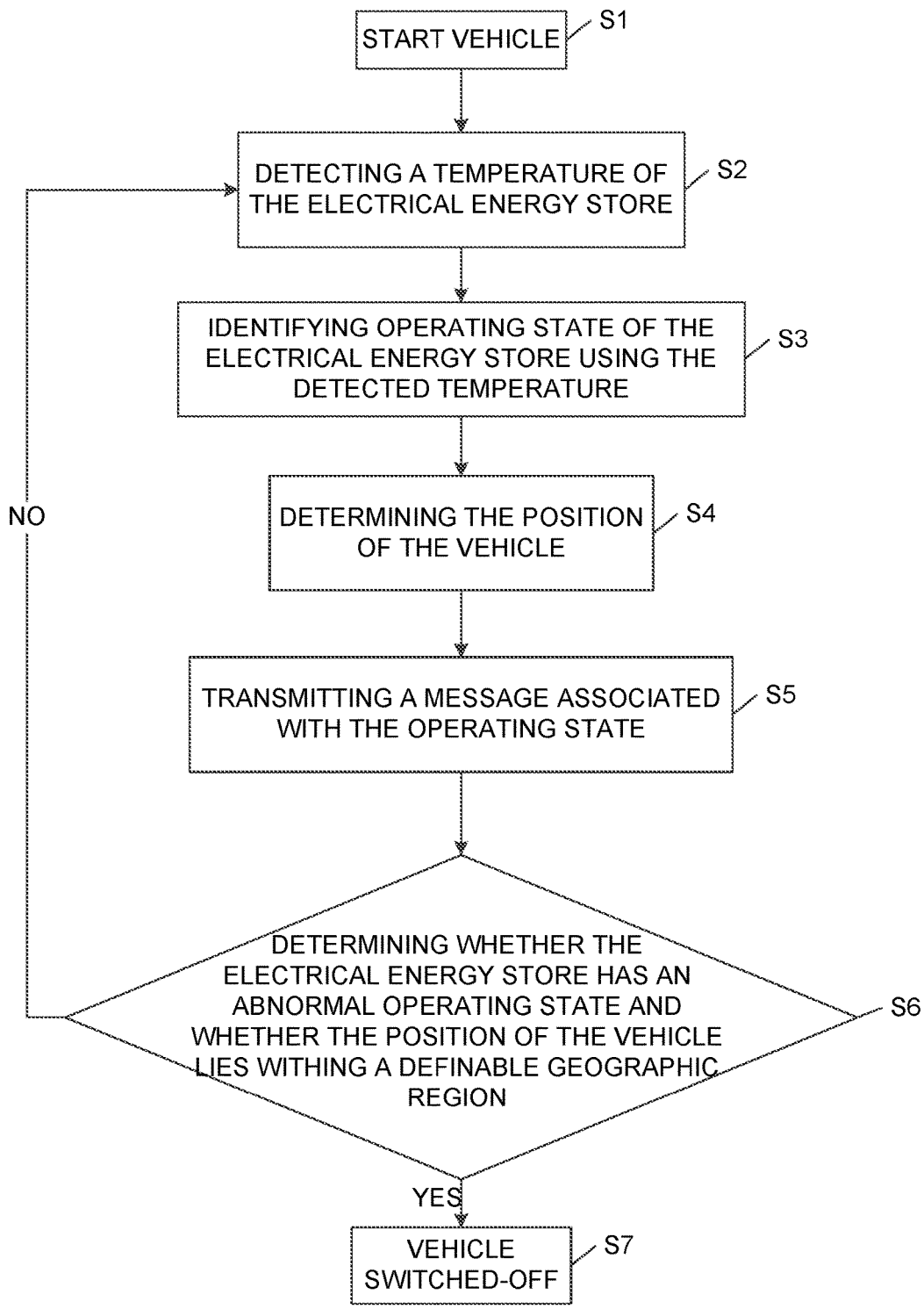
FIG. 1 is a flow diagram of an embodiment of the method according to the invention.

FIG. 1 shows a flow diagram of an embodiment of the method according to the invention for operating an assistance system of a vehicle having at least one electrical energy store. The method is started in step S1, for example when the vehicle starts.

In step S2, a temperature of the electrical energy store of the vehicle is detected by means of at least one sensor, for instance by a temperature sensor. The detected temperature is transmitted by wired and/or wireless means to a control unit, for example to a control unit of the vehicle and/or to a smartphone.

Detected temperatures are advantageously de-bounced by the sensor or the control device in order to reduce a number of possible false alarms.

In step S3, the control unit uses the detected temperature of the electrical energy store to identify an operating state of the electrical energy store, for example if a charging process and/or discharging process for the electrical energy store is in progress, the electrical energy store is being operated in the normal operating state, or the electrical energy store is in an abnormal, critical operating state.

An abnormal operating state exists, for example, if the temperature of the electrical energy store exceeds a defined threshold value of 200° C. and is highly likely to cause a fire in the electrical energy store.

In step S4, a position of the vehicle is determined using a satellite-based and/or cellular-network based technique by means of a control unit of the vehicle, by means of a navigation system of the vehicle and/or by means of a smartphone of the driver.

In another embodiment, at least one operating parameter of the vehicle is detected, for instance a speed of the vehicle.

In step S5, the identified operating state is transmitted to the assistance system by wired means, for instance a message by means of a CAN bus of the vehicle, and/or by wireless means, for example an encrypted message by means of short-range radio communication.

In step S6, the assistance system checks whether the electrical energy store has an abnormal operating state and whether the position of the vehicle lies within a definable geographic region, and in step S6 a signal is generated. If the electrical energy store does not have an abnormal operating state and/or the position lies outside a definable geographic region, the method is continued in step S2.

The method is terminated in step S7 as soon as the vehicle is switched off, once a charging process at a charging station is finished after the vehicle is switched off, and/or after a predefined time interval.

In an alternative embodiment, the method is continuously repeated cyclically if the position of the switched-off vehicle lies within the definable geographic region, so that an emergency call is initiated even for a switched-off vehicle as soon as an abnormal operating state exists, for example by overheating of the electrical energy store during a charging process.

Figure 2:
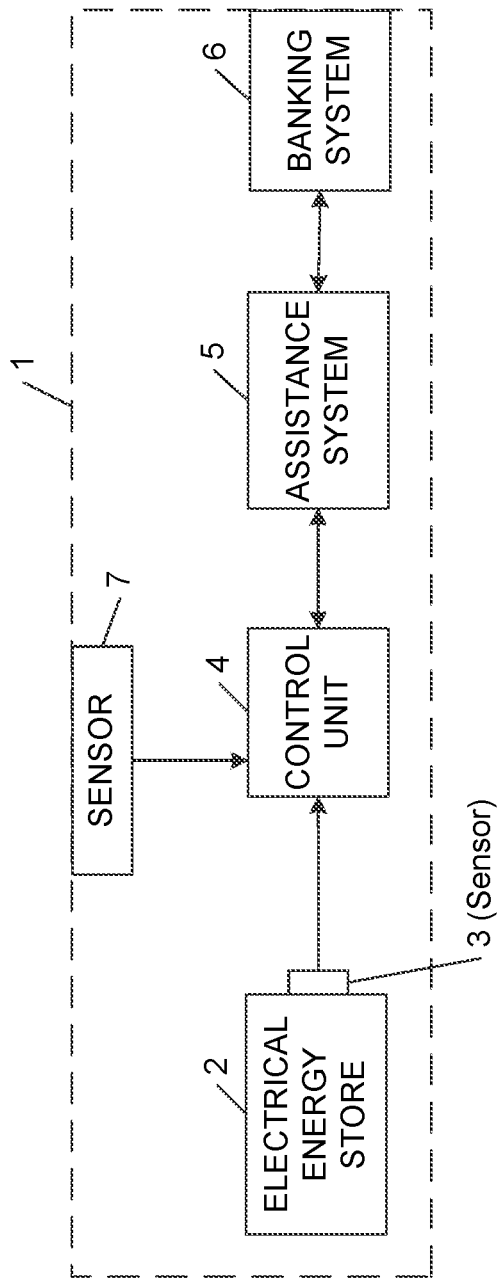
FIG. 2 shows an embodiment of the assistance system according to the invention.

FIG. 2 shows an assistance system 1 of a vehicle having at least one electrical energy store 2. A sensor 3 detects a temperature of the electrical energy store 2 and transmits this temperature by wired and/or wireless means to a control unit, for example to a control unit of the motor vehicle and/or to a smartphone. The control unit 4 identifies an operating state of the electrical energy store 2 and transmits said state to the assistance system 5 of the vehicle. The assistance system 5 generates a signal, for example the assistance system sends an electronic message to an emergency braking system 6 of the vehicle, if a position of the vehicle detected by a sensor 7 lies within a definable geographic region.

In another embodiment, the signal triggers a visual, acoustic and/or haptic notification to a driver of the vehicle, so that the driver can take suitable action.

The invention claimed is:

1. A method for operating an assistance system of a vehicle having at least one electrical energy store, the method comprising:
    detecting a temperature of the electrical energy store of the vehicle by means of at least one first sensor;
    identifying, with a control unit, an operating state of the electrical store using the detected temperature of the electrical energy store;
    determining a position of the vehicle, detecting an operating parameter of the vehicle, or both by means of at least one second sensor;
    transmitting the operating state to the assistance system of the vehicle; and
    in the event of an abnormal operating state of the electrical energy store, generating at least one signal if the position of the vehicle lies within a definable geographic region, wherein the at least one signal prevents restarting of the drive system of the vehicle as long as the electrical energy store is in an abnormal operating state and the position of the vehicle lies within the definable geographic region.

2. The method as claimed in claim 1, characterized in that the signal initiates an instantaneous intervention for reducing a speed of the vehicle.

3. The method as claimed in claim 1, characterized in that the signal initiates deceleration of the vehicle by means of a braking intervention.

4. The method as claimed in claim 1, characterized in that the signal initiates isolation of the electrical energy store from a drivetrain of the vehicle.

5. The method as claimed in claim 1, characterized in that the signal initiates an emergency running mode of the vehicle at a reduced drive power.

6. The method as claimed in claim 1, characterized in that the signal initiates switching-on a hazard warning system of the vehicle.

7. The method as claimed in claim 1, characterized in that the signal initiates an emergency call to an emergency call center.

8. The method as claimed in claim 1, characterized in that the signal triggers at least one selected from the group consisting of a visual, acoustic and haptic warning to a driver of the vehicle.

9. The method as claimed in claim 1, characterized in that the signal is transmitted by wired means, by and/or wireless means, or a combination of both.

10. The method as claimed in claim 1, characterized in that the position of the vehicle is determined using a satellite-based technique, a cellular-network based technique, or a combination of both by means of a control unit of the vehicle, by means of a navigation system of the vehicle, by means of a smartphone of the driver, or a combination of both.

11. The method as claimed in claim 1, characterized in that the operating parameter is selected from the group consisting of the speed of the vehicle, a wheel speed, an instantaneous request by the driver of the vehicle, a charging or discharging current of the electrical energy store, an external temperature, a steering angle, a transverse acceleration of the vehicle, and a combination of two or more of the foregoing.

12. An assistance system comprising at least one control unit, the control unit configure to
    detect a temperature of the electrical energy store of a vehicle by means of at least one first sensor;
    identify, with a control unit, an operating state of the electrical store using the detected temperature of the electrical energy;
    determine a position of the vehicle, detecting an operating parameter of the vehicle, or both by means of at least one second sensor;
    transmit the operating state to the assistance system of the vehicle; and
    in the event of an abnormal operating state of the electrical energy store, generate at least one signal if the position of the vehicle lies within a definable geographic region, and wherein the at least one signal prevents restarting of the drive system of the vehicle as long as the electrical energy store is in an abnormal operating state and the position of the vehicle lies within the definable geographic region.

13. The assistance system of claim 12, wherein the vehicle having at least one selected from the group consisting of a lithium-ion battery, a lithium-sulfur battery, and a lithium-air battery.

\* \* \* \* \*